(12) United States Patent
Inoue

(10) Patent No.: US 11,722,233 B2
(45) Date of Patent: Aug. 8, 2023

(54) MOBILE TERMINAL TESTING APPARATUS, MOBILE TERMINAL TESTING SYSTEM, AND CONTROL METHOD FOR MOBILE TERMINAL TESTING APPARATUS

(71) Applicant: ANRITSU CORPORATION, Kanagawa (JP)

(72) Inventor: Naoki Inoue, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 109 days.

(21) Appl. No.: 17/177,483

(22) Filed: Feb. 17, 2021

(65) Prior Publication Data

US 2021/0281341 A1 Sep. 9, 2021

(30) Foreign Application Priority Data

Mar. 4, 2020 (JP) ................................ 2020-037056

(51) Int. Cl.
*H04J 3/14* (2006.01)
*H04W 24/08* (2009.01)
*H04B 17/23* (2015.01)

(52) U.S. Cl.
CPC ............... *H04J 3/14* (2013.01); *H04W 24/08* (2013.01); *H04B 17/23* (2015.01)

(58) Field of Classification Search
CPC ........... H04B 17/21; H04B 17/23; H04J 3/14; H04W 24/08
See application file for complete search history.

(56) References Cited

U.S. PATENT DOCUMENTS

| 2011/0141934 | A1* | 6/2011 | Aoki | ...................... H04B 17/23 370/252 |
| 2012/0214479 | A1* | 8/2012 | Aoki | ...................... H04M 1/24 455/423 |

(Continued)

FOREIGN PATENT DOCUMENTS

| CN | 108280001 A | * | 7/2018 | .......... G06F 11/2273 |
| CN | 109120358 A | * | 1/2019 | .......... H04B 17/318 |

(Continued)

OTHER PUBLICATIONS

Agilent, "Agilent PXT Wireless Communications Test Set (E6621A) User's Guide", Agilent Technologies, Inc. 2010-2013, https://xdevs.com/doc/HP_Agilent_Keysight/PXT%20Wireless%20Communications%20Test%20Set%20%28E6621A%29%20User%27s%20Guide%20E6621-90002%20%5B251%5D.pdf, Total pp. 251 (Year: 2013).*

(Continued)

*Primary Examiner* — Shah M Rahman
(74) *Attorney, Agent, or Firm* — Pearne & Gordon LLP

(57) ABSTRACT

Provided are a mobile terminal testing apparatus, a mobile terminal testing system, and a control method for a mobile terminal testing apparatus which can prevent the level of the multiplexed signal transmitted and received to and from a mobile terminal from being misidentified. Provided is a mobile terminal testing apparatus which tests a waveform of a multiplexed signal obtained by multiplexing a uplink signal transmitted by a mobile terminal and a downlink signal transmitted to the mobile terminal by time division multiplexing, in which area information 21 of a first display mode indicating the uplink signal and area information 22 of a second display mode indicating the downlink signal are displayed in association with the waveform 23 of the multiplexed signal, on the display unit.

3 Claims, 4 Drawing Sheets

(56) References Cited

U.S. PATENT DOCUMENTS

| | | | | |
|---|---|---|---|---|
| 2012/0327782 A1* | 12/2012 | Tanaka | ............... | H04W 24/06 370/241 |
| 2014/0204912 A1* | 7/2014 | Tanaka | ............... | H04W 24/10 370/335 |
| 2014/0215281 A1* | 7/2014 | Tanaka | ............... | H04L 43/50 714/712 |
| 2014/0233623 A1* | 8/2014 | Suenaga | ............ | H04L 27/2634 375/224 |
| 2015/0215938 A1* | 7/2015 | Arai | ............... | H04B 1/38 455/452.2 |
| 2015/0264590 A1* | 9/2015 | Michl | ............... | H04W 24/06 455/67.14 |
| 2016/0086571 A1* | 3/2016 | Aoki | ............... | G06F 3/04847 345/593 |
| 2017/0317907 A1* | 11/2017 | Chinbe | ............... | H04B 15/00 |
| 2017/0366282 A1* | 12/2017 | Aoki | ............... | H04B 17/15 |
| 2018/0343575 A1* | 11/2018 | Ogawa | ............... | H04L 5/00 |
| 2018/0343650 A1* | 11/2018 | Zhou | ............... | H04L 5/0053 |
| 2019/0037424 A1* | 1/2019 | Shirasaki | ............... | H04L 5/001 |
| 2019/0123820 A1* | 4/2019 | Heath | ............... | H04B 1/525 |

FOREIGN PATENT DOCUMENTS

| | | | | |
|---|---|---|---|---|
| CN | 110690929 A | * | 1/2020 | |
| CN | 109688599 B | * | 4/2022 | ............ H04W 24/02 |
| JP | 2002279463 A | * | 9/2002 | |
| JP | 2008048330 A | * | 2/2008 | |
| JP | 2008306505 A | * | 12/2008 | ............. H04J 13/00 |
| JP | 2014-123832 A | | 7/2014 | |
| JP | 2014138417 A | * | 7/2014 | |
| JP | 2015-192351 A | | 11/2015 | |
| JP | 6476249 B1 | | 2/2019 | |
| JP | 6517895 B2 | | 5/2019 | |

OTHER PUBLICATIONS

Keysight, "LTE & LTE-Advanced FDD/TDD X-Series Measurement App, Traditional UI Technical Overview LTE/LTE-Advanced FDD: N9080EM0D LTE/LTE-Advanced TDD: N9082EM0D", Keysight Technologies, Apr. 24, 2018, https://www.keysight.com/us/en/assets/7018-06107/technical-overviews/5992-2878.pdf, Total pp. 19 (Year: 2018).*

3GPP, "LTE• Evolved Universal Terrestrial' Radio Access (E-UTRA); Physical channels and modulation (3GPP TS 36.211 version 12.5.0 Release 12)", Apr. 2015, pp. 13-14, Total pp. 3 (Year: 2015).*

Antitsu, describing 3GPP Signal Analyzer for for Anritsu RF and Microwave Handheld Instruments, Anritsu Company, USA, Jan. 2020 (Year: 2020).*

Rohde & Schwarz, describing R&S® FSVA3000/ R&S® FSV3000 Signal and Spectrum Analyzer User Manual, Rohde & Schwarz GmbH & Co. KG, 2020 (Year: 2020).*

Rohde & Schwarz, describing Universal Radio Communication Tester(R) CMU 300, Rohde & Schwarz GmbH & Co. KG, Apr. 2006 (Year: 2006).*

* cited by examiner

MOBILE TERMINAL TESTING APPARATUS, MOBILE TERMINAL TESTING SYSTEM, AND CONTROL METHOD FOR MOBILE TERMINAL TESTING APPARATUS

TECHNICAL FIELD

The present invention relates to a mobile terminal testing apparatus, a mobile terminal testing system, and a control method for a mobile terminal testing apparatus.

BACKGROUND ART

As a mobile terminal testing apparatus in the related art, for example, Patent Document 1 and Patent Document 2 have proposed that a multiplexed signal obtained by multiplexing a downlink signal and an uplink signal by time division multiplexing is transmitted and received to and from a mobile terminal, and the level of the multiplexed signal is measured.

RELATED ART DOCUMENT

[Patent Document]
[Patent Document 1] Japanese Patent No. 6476249
[Patent Document 2] Japanese Patent No. 6517895

DISCLOSURE OF THE INVENTION

Problem that the Invention is to Solve

However, in the mobile terminal testing apparatus in the related art as described above, when the level of the multiplexed signal transmitted and received to and from the mobile terminal is displayed on the display device, when there is a difference in the floor level (low) between the downlink signal and the uplink signal, there is a problem that a low-level signal may be misidentified as a high-level signal.

The present invention has been made to solve such a problem, and an object of the present invention is to provide a mobile terminal testing apparatus, a mobile terminal testing system, and a control method for a mobile terminal testing apparatus, which can prevent the level of a multiplexed signal transmitted and received to and from a mobile terminal from being misidentified.

Means for Solving the Problem

A mobile terminal testing apparatus of the present invention is a mobile terminal testing apparatus (1) which tests a waveform of a multiplexed signal obtained by multiplexing an uplink signal transmitted by a mobile terminal (2) and a downlink signal transmitted to the mobile terminal by time division multiplexing, including: a pseudo base station unit (10) that functions as a base station for the mobile terminal; a test control unit (13) that controls the pseudo base station unit; and a display unit (14) that displays the waveform of the multiplexed signal, wherein the test control unit displays the uplink signal and the downlink signal included in the multiplexed signal on the display unit so as to be identifiable.

With this configuration, since the mobile terminal testing apparatus of the present invention displays the uplink signal and the downlink signal included in the multiplexed signal are displayed on the display unit so as to be identifiable, it is possible to prevent the level of the multiplexed signal from being misidentified.

Further, in the mobile terminal testing apparatus of the present invention, the test control unit may be configured to display area information for identifying a time domain corresponding to the uplink signal and a time domain corresponding to the downlink signal in association with the waveform of the multiplexed signal, on the display unit.

With this configuration, since the mobile terminal testing apparatus of the present invention displays area information for identifying a time domain corresponding to the uplink signal and a time domain corresponding to the downlink signal in association with the waveform of the multiplexed signal, on the display unit, it is possible to prevent the level of the multiplexed signal from being misidentified.

Further, the mobile terminal testing apparatus of the present invention may be configured to display on the display unit, area information indicating a time domain corresponding to the uplink signal and area information indicating a time domain corresponding to the downlink signal in different color schemes.

With this configuration, since the mobile terminal testing apparatus of the present invention displays on the display unit, area information indicating a time domain corresponding to the uplink signal and area information indicating a time domain corresponding to the downlink signal in different color schemes, it is possible to prevent the level of the multiplexed signal from being misidentified.

A mobile terminal testing system of the present invention includes: a mobile terminal testing apparatus (1) which tests a waveform of a multiplexed signal obtained by multiplexing an uplink signal transmitted by a mobile terminal (2) and a downlink signal transmitted to the mobile terminal by time division multiplexing; and a test control apparatus (4) that controls the mobile terminal testing apparatus, in which the mobile terminal testing apparatus includes a pseudo base station unit (10) that functions as a base station for the mobile terminal, the test control apparatus includes a test control unit (13) that controls the pseudo base station unit, and a display unit (14) that displays the waveform of the multiplexed signal, and the test control unit displays the uplink signal and the downlink signal included in the multiplexed signal on the display unit so as to be identifiable.

With this configuration, since the mobile terminal testing system of the present invention displays the uplink signal and the downlink signal included in the multiplexed signal are displayed on the display unit so as to be identifiable, it is possible to prevent the level of the multiplexed signal from being misidentified.

A control method for a mobile terminal testing apparatus of the present invention is a control method for a mobile terminal testing apparatus (1) which includes a pseudo base station unit (10) that functions as a base station for a mobile terminal (2), a test control unit (13) that controls the pseudo base station unit, and a display unit (14) that displays a waveform of a multiplexed signal obtained by multiplexing an uplink signal transmitted by the mobile terminal and a downlink signal transmitted to the mobile terminal by time division multiplexing, and tests the waveform of the multiplexed signal, the control method causing the test control unit to execute a step of displaying the uplink signal and the downlink signal included in the multiplexed signal on the display unit so as to be identifiable.

As described above, in the control method for a mobile terminal testing apparatus of the present invention, the uplink signal and the downlink signal included in the multiplexed signal are displayed on the display unit so as to be identifiable, so that it is possible to prevent the level of the multiplexed signal from being misidentified.

Advantage of the Invention

The present invention can provide a mobile terminal testing apparatus, a mobile terminal testing system, and a control method for a mobile terminal testing apparatus which can prevent the level of the multiplexed signal from being misidentified.

BEST MODE FOR CARRYING OUT THE INVENTION

Embodiments of the present invention will be described below with reference to the drawings. In the embodiment of the present invention, an example will be described in which the mobile terminal testing apparatus according to the present invention is applied to a mobile terminal testing apparatus for testing a mobile terminal conforming to the standard specifications of 5G New Radio (NR) which is a 5th Generation (5G) wireless system.

Figure 1:
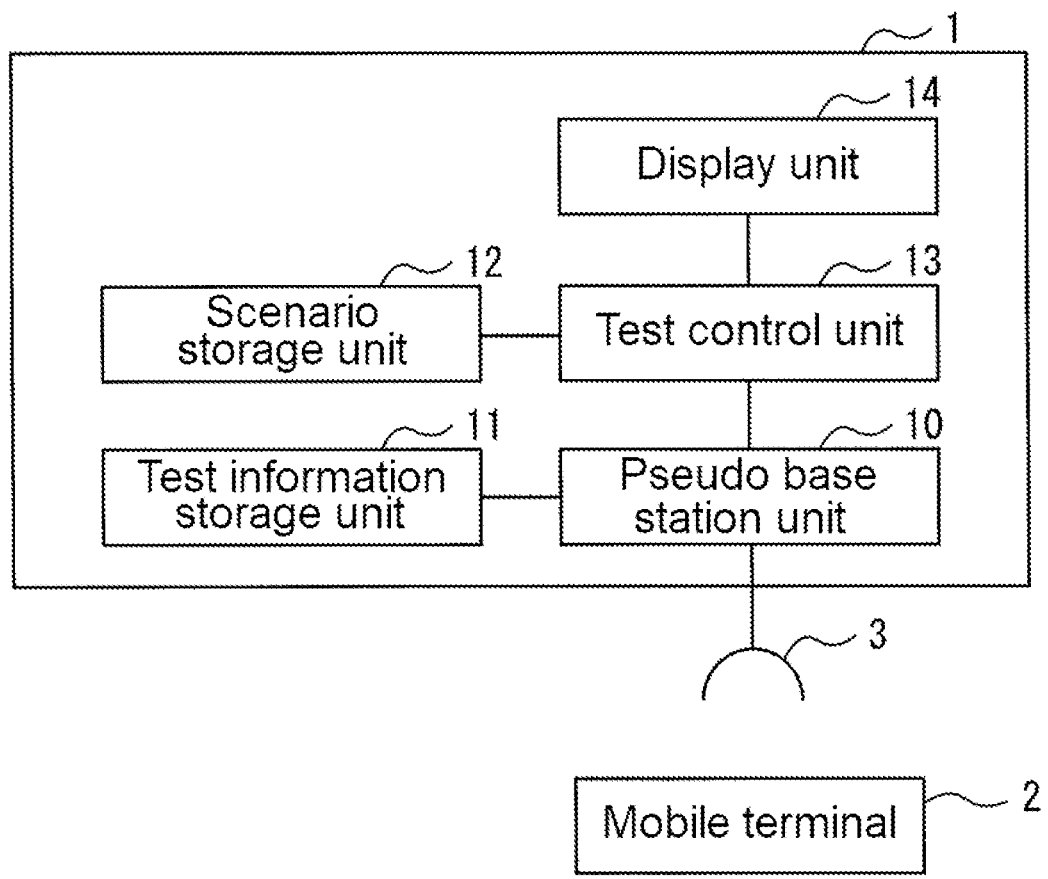
FIG. 1 is a block diagram of a mobile terminal testing apparatus according to an embodiment of the present invention.

As shown in FIG. 1, a mobile terminal testing apparatus 1 wirelessly transmits and receives signals to and from a mobile terminal 2 via an antenna 3. Further, the mobile terminal testing apparatus 1 can transmit and receive signals to and from the mobile terminal 2 by wire via a coaxial cable or the like.

The mobile terminal testing apparatus 1 includes a pseudo base station unit 10 that functions as a base station for the mobile terminal, a test information storage unit 11 that stores test information including parameters for controlling the pseudo base station unit 10, a scenario storage unit 12 which stores information including a scenario for testing a mobile terminal 2, a test control unit 13 that controls the pseudo base station unit 10, based on the information stored in the scenario storage unit 12, and a display unit 14 that displays test results of the mobile terminal 2, and the like.

Here, the mobile terminal testing apparatus 1 is a computer device (not shown) provided with a communication circuit for communicating with the mobile terminal 2. The computer device includes a central processing unit (CPU), a read only memory (ROM), a random access memory (RAM), a hard disk device, an input/output port, and a touch panel, which are not shown.

A program for making a computer device function as a mobile terminal testing apparatus 1 is stored in a ROM and a hard disk device of the computer device. That is, the CPU executes the program stored in the ROM with the RAM as a work area, and the computer device functions as the mobile terminal testing apparatus 1.

The pseudo base station unit 10 includes a CPU and a communication circuit. The test information storage unit 11 and the scenario storage unit 12 is a RAM or a hard disk device. The test control unit 13 is a CPU.

The display unit 14 is a liquid crystal display device that constitutes a touch panel. The touch panel includes a liquid crystal display device and a touch pad. Through this touch pad, the test control unit 13 is subjected to test selection, test execution instruction, test parameter setting, test result display adjustment, and the like.

In the present embodiment, an example of causing the mobile terminal testing apparatus 1 to execute a transmission/reception signal waveform test for testing the waveform of a signal according to Aggregate power tolerance defined in 3GPP TS 38.521-1.

In 5G NR, a radio frame is composed of 10 subframes, and one subframe is composed of one or more slots. Each slot is assigned to an uplink signal transmitted from the mobile terminal 2 or a downlink signal transmitted from the pseudo base station unit 10 to the mobile terminal 2. That is, a multiplexing signal in which the uplink signal and the downlink signal are multiplexed by time division multiplexing is transmitted and received between the mobile terminal 2 and the pseudo base station unit 10.

In the transmission/reception signal waveform test of the present embodiment, the test control unit 13 controls the mobile terminal 2 via the pseudo base station unit 10 such that the uplink signal of the predetermined slot has reached a high level, and displays the multiplexed signal in which the predetermined slot has reached a high level on the display unit 14.

In the test information storage unit 11, slots and the like to be set to a high level are stored in advance as test parameters. These test parameters can be changed via the test control unit 13 using a touch panel or the like.

Figure 2:
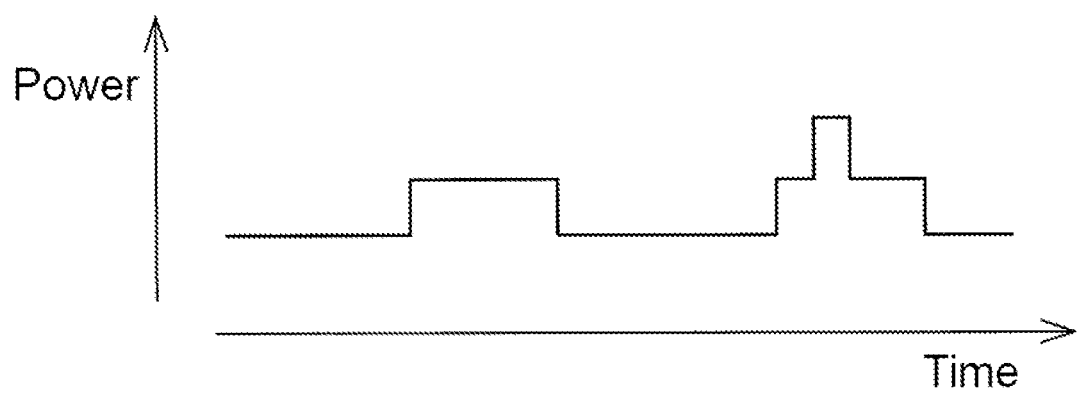
FIG. 2 is a graph for explaining a multiplexed signal in the mobile terminal testing apparatus according to the embodiment of the present invention.

As shown in FIG. 2, when there is a difference in floor level (low level) between the downlink signal and the uplink signal of the multiplexed signal, for example, the low level of the uplink signal may be misidentified as a signal of a high level of the downlink signal.

Therefore, the test control unit 13 displays the uplink signal and the downlink signal included in the multiplexed signal so as to be identifiable on the display unit 14.

Figure 3:
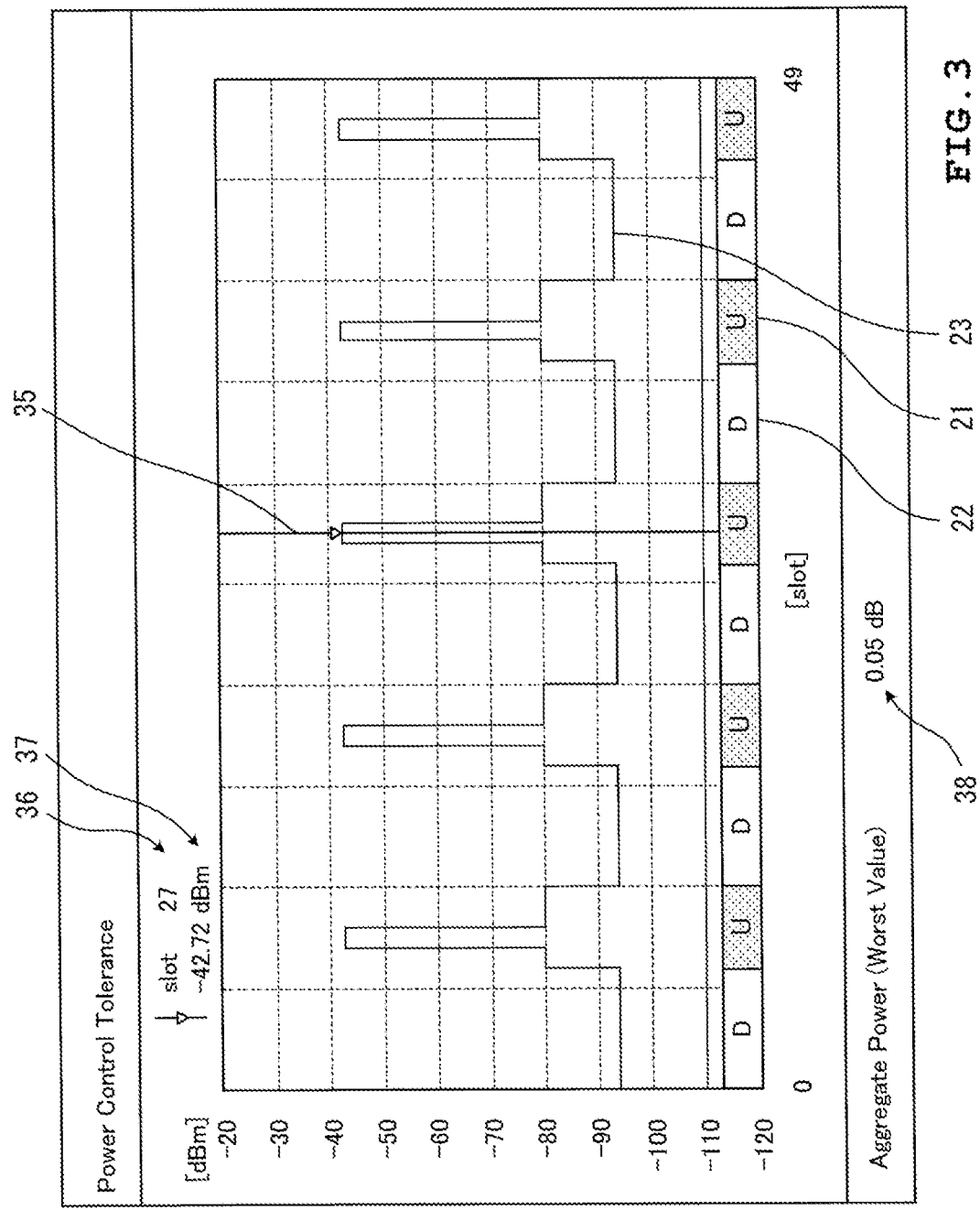
FIG. 3 is a diagram showing a display example of a test result display screen of the mobile terminal testing apparatus according to the embodiment of the present invention.

As shown in FIG. 3, the test control unit 13 causes the display unit 14 to display a test result display screen representing the test result of the transmission/reception signal waveform test. FIG. 3 shows a display example of the test result display screen when six subframes are assigned for the downlink signal, four subframes are assigned for the uplink, and the eighth uplink slot is set to a high level.

In the present embodiment, the test control unit 13 displays the area information 21 and 22 for identifying the time domain corresponding to the uplink signal and the time domain corresponding to the downlink signal in association with the waveform 23 of the multiplexed signal, on the test result display screen.

For example, the test control unit 13 displays the area information 21 representing the time domain corresponding to the uplink signal and the area information 22 representing the time domain corresponding to the downlink signal on the test result display screen in different color schemes.

Instead of the area information 21 and 22, the test control unit 13 may display the uplink signal and the downlink signal on the test result display screen in different color schemes, line types, thicknesses, and the like.

Further, the test control unit 13 may display the area information 21 and 22 above the waveform 23 of the multiplexed signal instead of displaying the area information 21 and 22 below the waveform 23 of the multiplexed signal, or may display the area information 21 and 22 as the background of the waveform 23.

On the test result display screen, a cursor 35 that can be moved in the time axis direction according to an operation of a touch panel or the like is displayed. The position of the cursor 35 on the time axis is displayed in the cursor position display area 36. The test result corresponding to the time axis of the cursor 35 is displayed in the cursor value display area 37.

The test control unit 13 displays the worst value of the error between a reference first slot and the second and subsequent slots, among the slots set to the high level, in the error display area 38 of the test result display screen.

The test control unit 13 may change the character color to be displayed in the error display area 38, when the worst value of the error between the reference first slot and the second and subsequent slots, among the slots set to the high level, is within a permissible range and when the worst value is out of the permissible range.

As described above, in the present embodiment, the uplink signal and the downlink signal included in the multiplexed signal is displayed on the display unit 14 in an identifiable manner, so that it is possible to prevent the level of the multiplexed signal from being misidentified.

Further, in the present embodiment, since the area information 21 and 22 for identifying the time domain corresponding to the uplink signal and the time domain corresponding to the downlink signal are displayed in association with the waveform 23 of the multiplexed signal on the display unit 14, it is possible to prevent the level of the multiplexed signal from being misidentified.

Further, in the present embodiment, since the area information 21 representing the time domain corresponding to the uplink signal and the area information 22 representing the time domain corresponding to the downlink signal are displayed on the display unit in different color schemes, it is possible to prevent the level of the multiplexed signal from being misidentified.

The mobile terminal testing apparatus 1 in the present embodiment may be configured to connect a general-purpose computer device including a CPU, a RAM, a ROM, a flash memory, a hard disk device, and a communication module.

Figure 4:
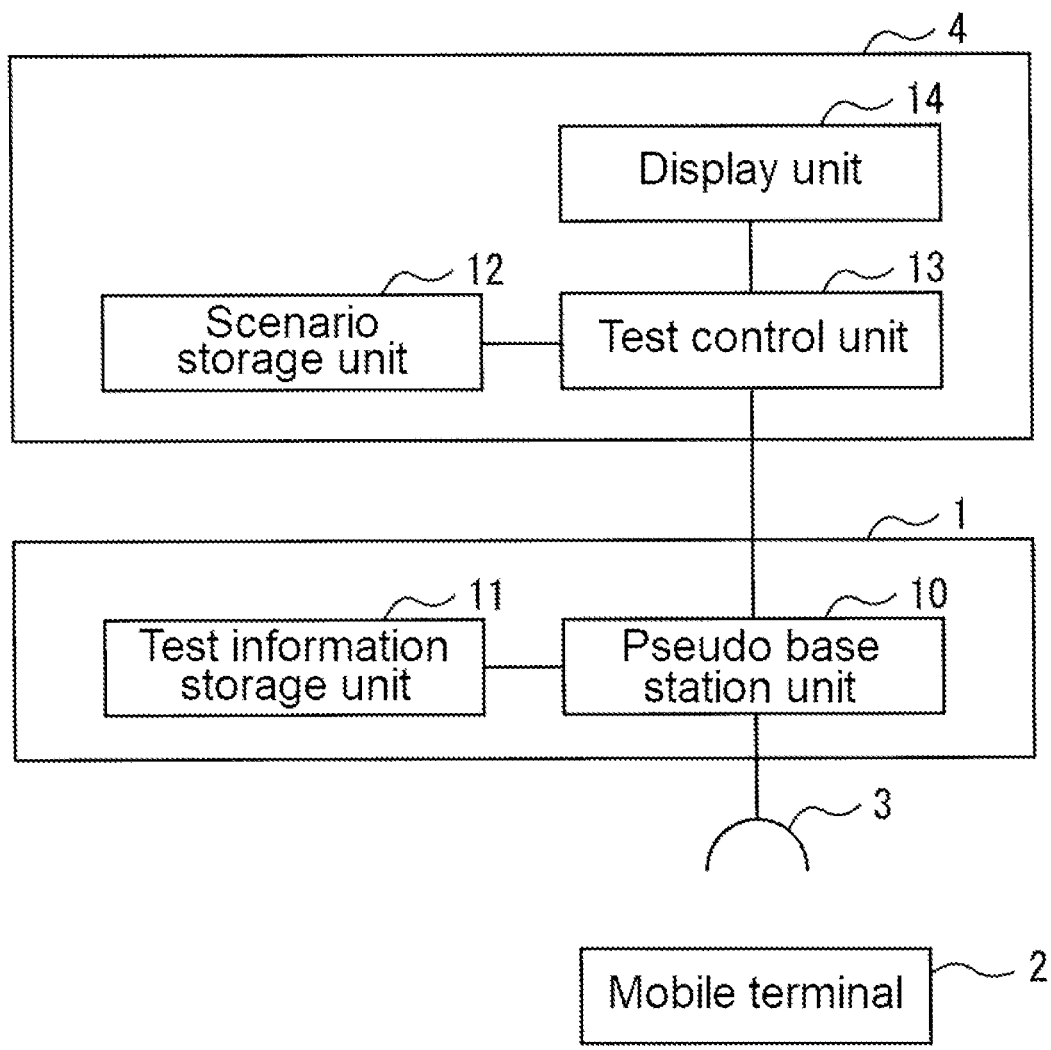
FIG. 4 is a block diagram of a mobile terminal testing system according to a modification example of the embodiment of the present invention.

In this case, as shown in FIG. 4, the test control apparatus 4 including the scenario storage unit 12, the test control unit 13, and the display unit 14 is configured by a general-purpose computer device, and the mobile terminal testing system may be configured by the mobile terminal testing apparatus 1 excluding the scenario storage unit 12, the test control unit 13, and the display unit 14, and the test control apparatus 4.

Although the embodiment of the present invention has been disclosed above, modifications may be made easily without departing from the scope of the invention. The embodiment of the present invention is disclosed on the premise that the equivalent with such modifications is included in the invention described in the claims.

DESCRIPTION OF REFERENCE NUMERALS AND SIGNS

1 Mobile terminal testing apparatus
2 Mobile terminal
4 Test control apparatus
10 Pseudo base station
11 Test information storage unit
13 Test control unit
14 Display unit

What is claimed is:

1. A mobile terminal testing apparatus configured to test a waveform of a multiplexed signal obtained by multiplexing an uplink signal transmitted by a mobile terminal and a downlink signal transmitted to the mobile terminal by time division multiplexing, comprising:
    a pseudo base station configured to function as a base station for the mobile terminal;
    a test controller configured to control the pseudo base station; and
    a display configured to display the waveform of the multiplexed signal,
    wherein the test controller is configured to display the uplink signal with an uplink period indication indicating a time period of the uplink signal and the downlink signal with a downlink period indication indicating a time period of the downlink signal on the display such that the uplink and downlink signals are identifiable with the uplink and downlink period indications on the display,
    wherein the test controller is configured to display area information for identifying a time domain corresponding to the uplink signal and area information for identifying a time domain corresponding to the downlink signal in different color schemes such that the uplink signal and the downlink signal are distinguishably displayed in association with the waveform of the multiplexed signal, on the display.

2. A mobile terminal testing system comprising:
    a mobile terminal testing apparatus configured to test a waveform of a multiplexed signal obtained by multiplexing an uplink signal transmitted by a mobile terminal and a downlink signal transmitted to the mobile terminal by time division multiplexing; and
    a test controller configured to control the mobile terminal testing apparatus,
    wherein the mobile terminal testing apparatus comprises a pseudo base station that functions as a base station for the mobile terminal,
    wherein the test control apparatus comprises:
        a test controller configured to control the pseudo base station unit, and
        a display configured to display the waveform of the multiplexed signal, and
    wherein the test controller is configured to display the uplink signal with an uplink period indication indicating a time period of the uplink signal and the downlink signal with a downlink period indication indicating a time period of the downlink signal on the display such that the uplink and downlink signals are identifiable with the uplink and downlink period indications on the display,
    wherein the test controller is configured to display area information for identifying a time domain corresponding to the uplink signal and area information for identifying a time domain corresponding to the downlink signal in different color schemes such that the uplink signal and the downlink signal are distinguishably displayed in association with the waveform of the multiplexed signal, on the display.

3. A control method for a mobile terminal testing apparatus which comprises:

a pseudo base station configured to function as a base station for a mobile terminal, a test controller configured to control the pseudo base station, and a display configured to display a waveform of a multiplexed signal obtained by multiplexing an uplink signal transmitted by the mobile terminal and a downlink signal transmitted to the mobile terminal by time division multiplexing, the method comprising:

testing the waveform of the multiplexed signal; and displaying the uplink signal with an uplink period indication indicating a time period of the uplink signal and the downlink signal with a downlink period indication indicating a time period of the downlink signal on the display such that the uplink and downlink signals are identifiable with the uplink and downlink period indications on the display, the displaying be caused by the test controller, wherein the test controller is configured to display area information for identifying a time domain corresponding to the uplink signal and area information for identifying a time domain corresponding to the downlink signal in different color schemes such that the uplink signal and the downlink signal are distinguishably displayed in association with the waveform of the multiplexed signal, on the display.

* * * * *